United States Patent [19]

Lieb et al.

[11] Patent Number: 5,894,703
[45] Date of Patent: Apr. 20, 1999

[54] FIBER GLASS-REINFORCED PLASTIC MAST

[75] Inventors: Helmut Lieb; Markus Roedle, both of Neumarkt; Georg Simson, Berg, all of Germany

[73] Assignee: Pfleiderer Verkehrstechnik GmbH & Co. KG, Neumarkt, Germany

[21] Appl. No.: 08/842,754

[22] Filed: Apr. 16, 1997

[30] Foreign Application Priority Data

Apr. 23, 1996 [DE] Germany .............. 196 16 144

[51] Int. Cl.$^6$ ............................................. E04H 12/00
[52] U.S. Cl. ............... 52/651.01; 52/726.4; 52/736.1; 52/736.2; 403/337
[58] Field of Search .................. 52/651.01, 40, 52/648.1, 736.1, 736.2, 726.1, 726.3, 726.4; 403/300, 306, 337

[56] References Cited

U.S. PATENT DOCUMENTS

| 546,710 | 9/1895 | Rogers | 52/40 |
|---|---|---|---|
| 591,221 | 10/1897 | Lane | 52/40 |
| 889,395 | 6/1908 | Noyes | 52/40 |
| 1,554,656 | 9/1925 | Pusey | 52/40 |
| 3,371,458 | 3/1968 | Sturgill | 52/40 |
| 3,561,711 | 2/1971 | Dodge | 52/116 X |
| 4,503,645 | 3/1985 | Nudd | 52/40 |

*Primary Examiner*—Carl D. Friedman
*Assistant Examiner*—Beth A. Aubrey
*Attorney, Agent, or Firm*—Jordan and Hamburg

[57] ABSTRACT

A fiber glass-reinforced plastic mast in the form of several fiber glass-reinforced pipes, which are at a distance from one another and braced relative to one another, the pipes preferably three pipes fixing an equilateral prism, are connected to one another by horizontal laminated panels disposed at different heights.

10 Claims, 2 Drawing Sheets

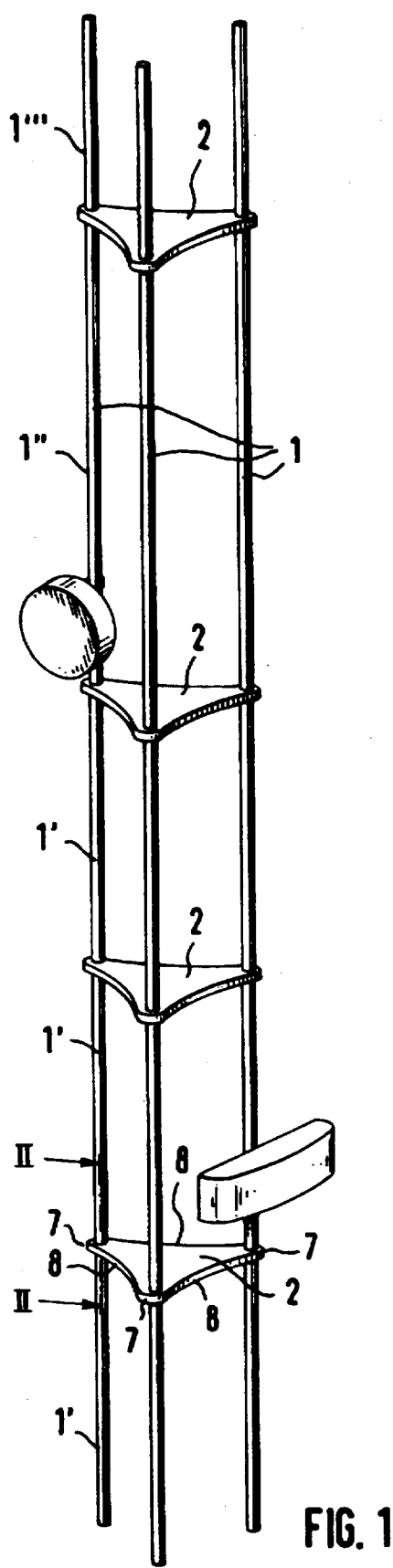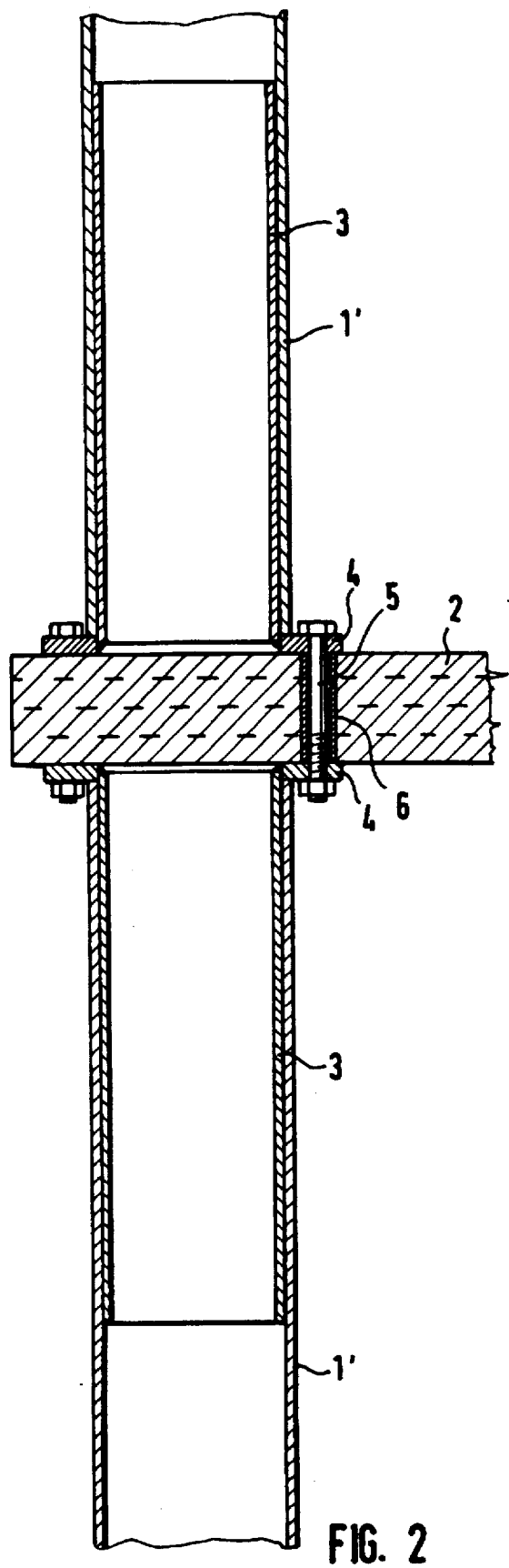
FIG. 1
FIG. 2

FIBER GLASS-REINFORCED PLASTIC MAST

BACKGROUND OF THE INVENTION

The invention relates to a fiber glass-reinforced plastic mast in the form of several fiber glass-reinforced pipes, which are at a distance from one another and braced relative to one another.

Aside from conical mast constructions, which are frequently manufactured by centrifugal methods, constructions similar to the known metal lattice masts, for which four fiber glass-reinforced plastic pipes, which form the edges of a straight prism, are joined together by struts, have also become known recently, for example, in antenna masts. Such braced fiber glass-reinforced plastic pipes are less expensive to manufacture and have a lesser area for attack by wind which makes it possible once again to reduce costs, since they are more slender and can be constructed from thinner pipes. Independently of the manner of bracing, such masts of braced fiber glass-reinforced plastic pipes are relatively susceptible to twisting and the lateral deflection in the antennas has also not yet been solved satisfactorily.

SUMMARY OF THE INVENTION

It is therefore an object of the invention to develop a fiber glass-reinforced plastic mast of the initially named type, so that the mast has improved strength properties with respect to the lateral deflection as well as the twisting, while the manufacturing process, as far as possible, remains the same or is simplified.

Pursuant to the invention, this objective is accomplished by making provisions so that the pipes, preferably three pipes, fixing an equilateral prism, are connected to one another by horizontal laminated panels disposed at different heights.

Surprisingly, it has been observed that the lateral deflection and also the twisting at the antenna level of such masts, having a height of 16 m, is less for such three-pipe masts having 3 or 4 such laminated panels than for four-pipe masts, which are braced repeatedly. Furthermore, because of the omission of one pipe in the preferred, inventive triangular prism construction, the assembly additionally is much simplified.

In a preferred embodiment of the invention, the horizontal, laminated panels, which can consist of metal or of a fiber-reinforced plastic, preferably consist of weather-resistant glued laminated wood, that is, of repeatedly glued wood panels, which preferably can also still have an additional plastic coating on the outside.

Such glued, laminated wood, which is furthermore sealed by a plastic covering, can be made to be extremely weather resistant and, at a low weight, has outstanding strength values, the inherent elasticity of such a wood panel offering further advantageous results for mast constructions.

In a further development of the invention, the pipes shall consist of individual pipe sections, the lengths of which preferably correspond to the vertical distance between adjacent horizontal laminated panels, the ends of the pipe sections being provided with flanges, which are connected with preferably metal anchoring pipes gripping into and fastening the plastic pipe sections.

The flanges enable the pipe sections to be simply bolted together, the horizontal laminated panel being disposed preferably in each case between the flanges, so that a separate procedure for fastening the horizontal laminated panels is not required. For constructing the horizontal laminated panels from fiber-reinforced plastic or from the preferred weather-resistant, glued laminated wood, the connecting bolts of the flange, in a further development of the invention, should pass through separator sleeves in the horizontal laminated panels, the length of which sleeve is somewhat less than the thickness of the horizontal laminated panels. In this way, the danger, arising out of the bending stress and the therefrom resulting tilting of adjacent pipe sections, that the flange will cut into the wood or plastic surface, is avoided. The use of separator sleeves can of course be omitted when horizontal laminated panels of metal are used. However, the use of such panels is not as advantageous in practice for other reasons.

Finally it is also still within the scope of the invention that the horizontal laminated panels are triangles with rounded corners and side edges bent inwards.

Further advantages, distinguishing features and details of the invention arise out of the following description of an embodiment and the accompanying drawings.

BRIEF DESCRIPTION OF THE DRAWINGS

FIG. 1 shows a perspective view of the inventive fiber glass-reinforced plastic mast, FIG. 2 shows an enlarged section through a fiber glass-reinforced plastic pipe in the region of the butt edge of two pipe sections and through the horizontal laminated panel fastened there.

DESCRIPTION OF THE PREFERRED EMBODIMENTS

Figure 3:
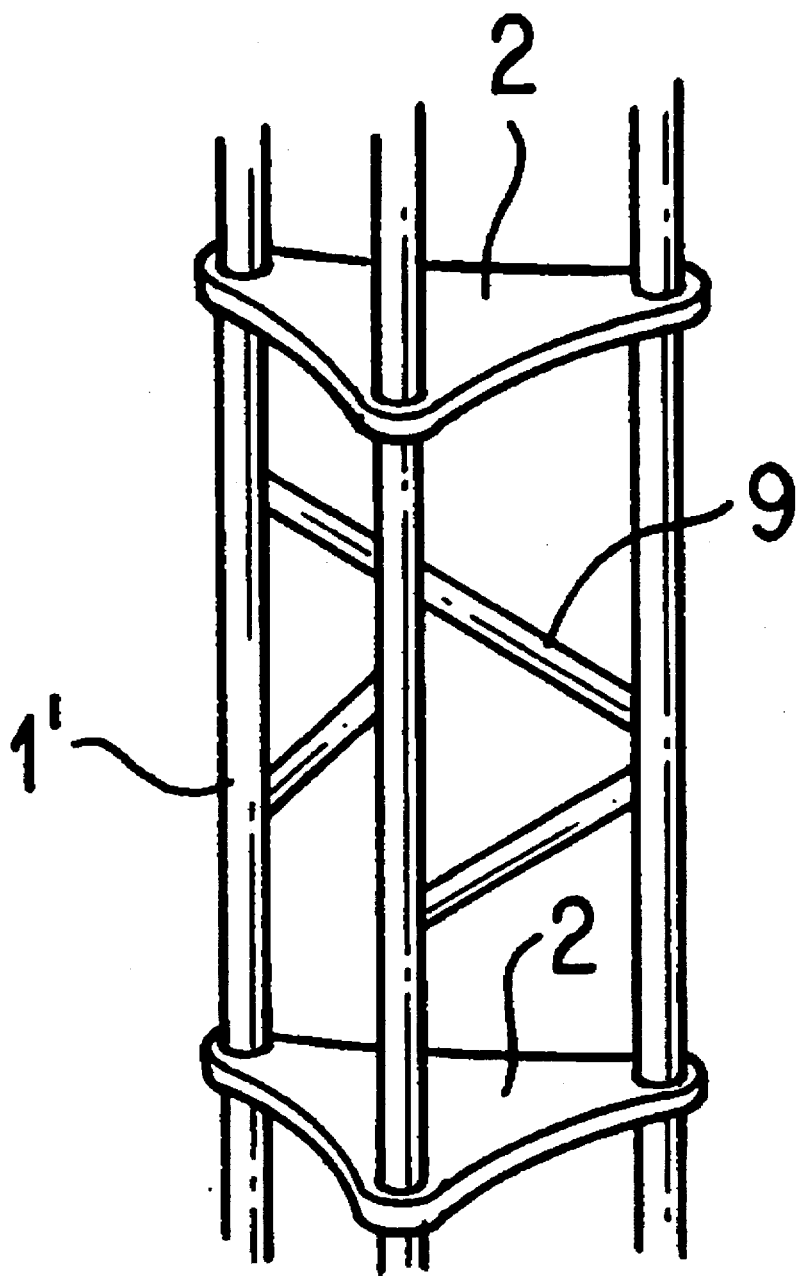
FIG. 3 shows a partial perspective view of an alternate embodiment which includes diagonal struts.

The fiber glass-reinforced plastic mast shown consists of three fiber glass-reinforced plastic pipes 1, which in each case are assembled from individual pipe sections 1', 1" and 1"', which in each case correspond to the distance between two superimposed horizontal laminated panels 2, which connect three pipes 1 together. The three fiber glass-reinforced plastic pipes 1 form the corner edges of the equilateral prism. For bracing such a mast with a total height of 16 m, three or preferably, as shown, four horizontal laminated panels are sufficient. These are disposed at 3 m, 6 m, 9m and 14 m above the ground. For an external diameter of the fiber glass-reinforced plastic pipes 1 of about 170 mm, the distances between the pipes in the examples shown are about 1.5 m.

The individual sections 1', 1" and 1"' of the pipes consist of a plastic pipe, into the end of which in each case a metal pipe 3, which is preferably formed from a high-grade steel and to which a metal flange 4 is welded in each case, is glued. A horizontal laminated panel 2 is disposed between the metal flanges 4, which are connected together by bolts 5, which pass through separator sleeves 6, the length of which is slightly less than the thickness of the panels 2. In the examples shown, the horizontal laminated panels consist of weather-resistant glued laminated wood, which has been glued repeatedly and is provided with a plastic coating. The metal anchoring pipes 3, which can also consist of galvanized steel instead of high-grade steel, are connected to the plastic pipes 1' by an adhesive joint employing a special adhesive. 4

As can be seen from FIG. 1, the horizontal laminated panels are triangular panels with rounded corners 7, the side edges 8 of which are bent inward. By these means, material is saved and, as a result the weight of the horizontal laminated panel is less.

The invention is not limited to the example shown. In principle, it would also be possible to construct a four-pipe mast with the help of the inventive horizontal laminated panels, although the stability and, in particular, the twisting resistance especially of the three-pipe construction is particularly advantageous. Moreover, as already stated, fewer than three or more than four horizontal laminated panels can also be used for the same height of 16 m. the given height of 16 m merely representing an example. In principle, all common fiber glass-reinforced plastic mast heights can be constructed in the inventive design. Moreover, instead of assembling the pipes 1 from individual sections, which are bolted together over a flange, it would also, of course, be conceivable to make them in one piece, which then, however, would make it necessary to anchor the horizontal laminated panels in a different way. Finally, although horizontal laminated panels generally are adequate, it would be appropriate in special cases and at very great heights to connect the pipes 1 between the horizontal laminated panels by diagonal struts 9 of fiber glass-reinforced plastic pipes.

What we claim is:

1. A fiber glass-reinforced mast comprising a plurality of fiber glass-reinforced pipes each having a longitudinal axis, said pipes being disposed in a spaced and parallel relationship in which the axes of said pipes are spaced from one another and are parallel to one another, and a plurality of longitudinally spaced supporting means attached to each of said pipes and supporting said pipes in said spaced and parallel relationship, each of said supporting means comprising a laminated panel with each of said panels being parallel to one another, each of said pipes including a plurality of longitudinally aligned pipe sections, each of said pipe sections having end portions, anchoring means connecting the end portions of two axially aligned pipe sections, said anchoring means including a pipe element disposed in each of said end portions of the two axially aligned pipe sections to be connected, and fastening means fastening said pipe elements to the respective end portions of the two axially aligned pipe sections, each of said pipe elements including a flange.

2. The fiber glass-reinforced plastic mast according to claim 1 wherein one of said laminated panels is disposed between said two axially aligned pipe sections in a position juxtaposed to opposed flanges on each of said pipe elements on respective end portions of two axially aligned pipe sections to be connected, and fastening means fastening said opposed flanges and said laminated panel.

3. The fiber glass-reinforced plastic mast according to claim 2 wherein said fastening means comprise bolts.

4. The fiber glass-reinforced plastic mast according to claim 2 further comprising a separator sleeve in said panel, said fastening means passing through said separator sleeve.

5. A fiber glass-reinforced mast comprising a plurality of fiber glass-reinforced pipes each having a longitudinal axis, said pipes being disposed in a spaced and parallel relationship in which the axes of said pipes are spaced from one another and are parallel to one another, and a plurality of longitudinally spaced supporting means attached to each of said pipes and supporting said pipes in said spaced and parallel relationship, each of said supporting means comprising a laminated panel with each of said panels being parallel to one another, said panels having a generally overall configuration of an equilateral triangle with rounded corners and concave sides.

6. A fiber glass-reinforced mast comprising a plurality of fiber glass-reinforced pipes each having a longitudinal axis, said pipes being disposed in a spaced and parallel relationship in which the axes of said pipes are spaced from one another and are parallel to one another, and a plurality of longitudinally spaced supporting means attached to each of said pipes and supporting said pipes in said spaced and parallel relationship, each of said supporting means comprising a laminated panel with each of said panels being parallel to one another, said plurality of fiber glass-reinforced pipes including three pipes which have their axes disposed at the corners of an equilateral triangle, each of said pipes including a plurality of longitudinally aligned pipe sections, each of said pipe sections having end portions, anchoring means connecting the end portions of two axially aligned pipe sections, said anchoring means including a pipe element disposed in each of said end portions of the two axially aligned pipe sections to be connected, and fastening means fastening said pipe elements to the respective end portions of the two axially aligned pipe sections, each of said pipe elements including a flange.

7. The fiber glass-reinforced plastic mast according to claim 6 wherein one of said laminated panels is disposed between said two axially aligned pipe sections in a position juxtaposed to opposed flanges on each of said pipe elements on respective end portions of two axially aligned pipe sections to be connected, and fastening means fastening said opposed flanges and said laminated panel.

8. The fiber glass-reinforced plastic mast according to claim 7 further comprising a separator sleeve in said panel, said fastening means passing through said separator sleeve.

9. The fiber glass-reinforced plastic mast according to claim 7 wherein said laminated panels are perpendicular to the longitudinal axes of said pipes.

10. A fiber glass-reinforced mast comprising a plurality of fiber glass-reinforced pipes each having a longitudinal axis, said pipes being disposed in a spaced and parallel relationship in which the axes of said pipes are spaced from one another and are parallel to one another, and a plurality of longitudinally spaced supporting means attached to each of said pipes and supporting said pipes in said spaced and parallel relationship, each of said supporting means comprising a laminated panel with each of said panels being parallel to one another, said plurality of fiber glass-reinforced pipes including three pipes which have their axes disposed at the corners of an equilateral triangle, said panels having a generally overall configuration of an equilateral triangle with rounded corners and concave sides.

* * * * *